US005313975A

United States Patent [19]

[11] Patent Number: 5,313,975

Nimberger

[45] Date of Patent: May 24, 1994

[54] GAS LOCKOUT SYSTEM

[75] Inventor: Spencer M. Nimberger, Houston, Tex.

[73] Assignee: Precision General, Inc., Houston, Tex.

[21] Appl. No.: 33,024

[22] Filed: Mar. 18, 1993

[51] Int. Cl.[5] .......................... F17D 1/06; F16K 35/00

[52] U.S. Cl. ....................................... 137/14; 137/383; 137/384.2; 137/458

[58] Field of Search ............... 137/14, 458, 383, 384.2

[56] References Cited

U.S. PATENT DOCUMENTS

| | | | |
|---|---|---|---|
| 3,166,084 | 1/1965 | Handley | 137/458 |
| 3,587,628 | 6/1971 | Farrer | 137/458 |
| 3,971,410 | 7/1976 | St. Clair | 137/458 |
| 4,491,149 | 1/1985 | Trinkwalder | 137/505.46 |

*Primary Examiner*—A. Michael Chambers
*Attorney, Agent, or Firm*—Browning, Bushman, Anderson & Brookhart

[57] ABSTRACT

A propane gas distribution system according to the present invention substantially enhances safety by providing a gas lockout device within the enclosure containing the distribution lines to the propane appliances for closing off a gas distribution line in response to either a sensed low pressure level or a sensed high pressure level. The closure member within the lockout device is biased closed, but is normally prevented from closing by a stop member which in turn is held in position until the unsafe low pressure or unsafe high pressure condition exists. A security control member is utilized for restricting the re-opening of the lockout device to select personnel, which typically would be a propane company representative. According to the method of the present invention, gas from the high pressure source is regulated and output to a low pressure gas distribution line. The gas pressure within the distribution line is sensed, and the gas line is automatically closed in response to a sensed low pressure level or a high sensed high pressure level. The gas distribution line is normally prevented from closing when gas pressure is above the low pressure level and below the high pressure level.

22 Claims, 3 Drawing Sheets

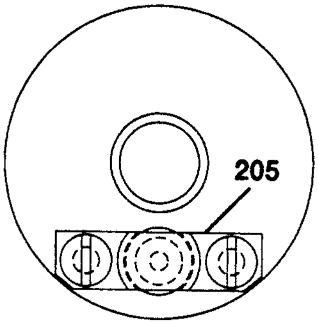
FIG.5
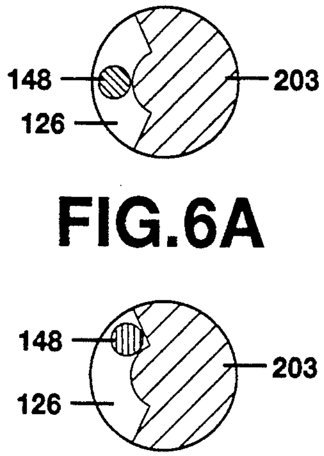
FIG.6A
FIG.6B
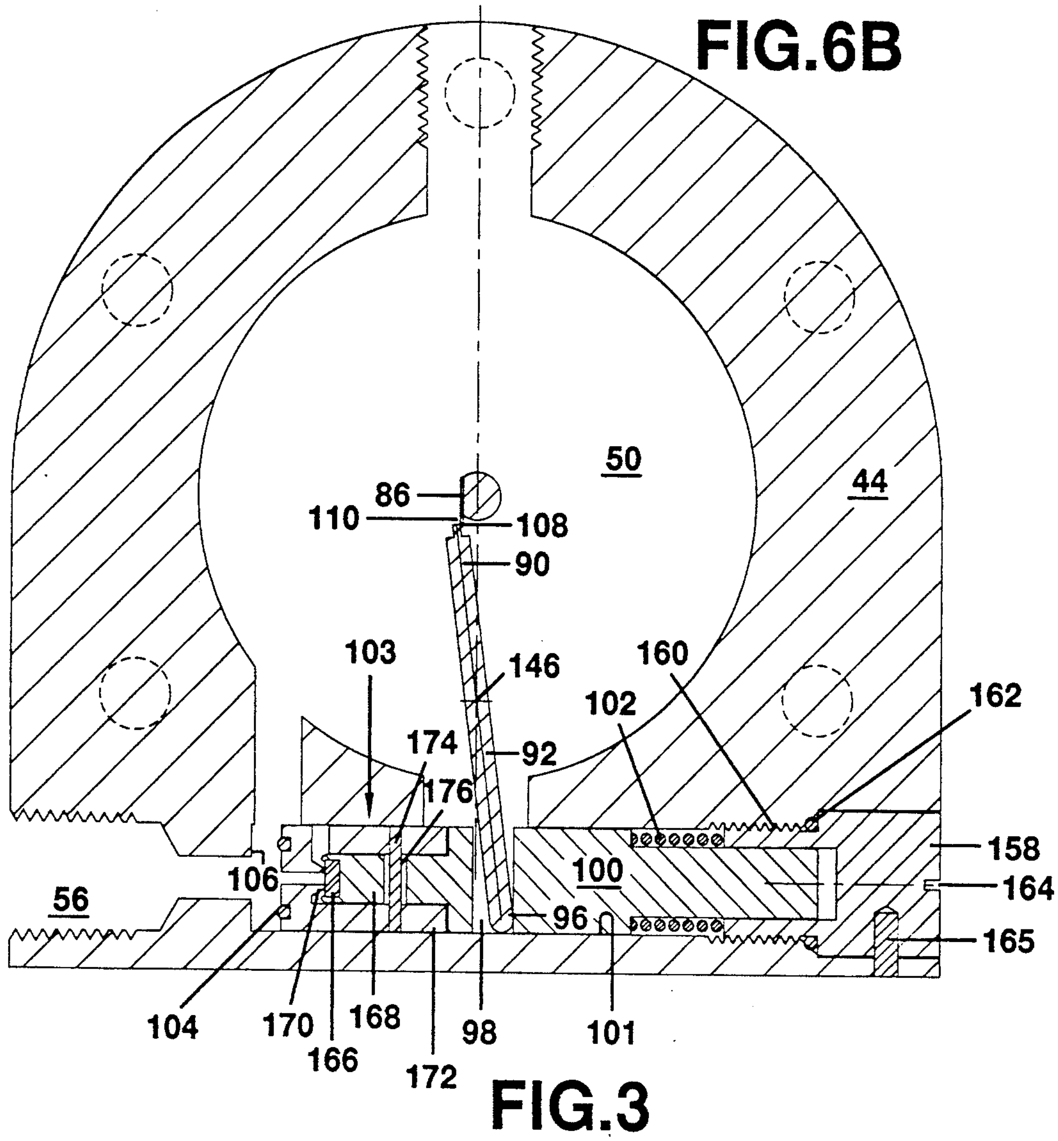
FIG.3

GAS LOCKOUT SYSTEM

FIELD OF THE INVENTION

The present invention relates to safety devices and, more particularly, to techniques for preventing the inadvertent release of a combustible gas from a gas storage and distribution system. The gas lockout device of this invention is particularly well suited for use within a residential gas distribution system to prevent the inadvertent release of propane, thereby significantly reducing the pain and grief associated with a catastrophic fire or explosion.

BACKGROUND OF THE INVENTION

The propane industry has long been plagued with the knowledge that a residential propane distribution system could inadvertently release the combustible gas into the customer's house. If fortunate, this releasing event occurred when no one was home, and the fire or explosion which results from this gas release then only destroys the structure and personal possessions of the family. If unfortunate, the explosion is triggered by or associated with the re-entry of the individual into the gas-filled house, and the simple act of switching on a light results in horror, pain, and possibly death to the returning individuals. The propane industry offers relatively cost-efficient fuel to many homeowners who prefer to live in rural surroundings which are not supplied by a community gas distribution system. Accordingly, refillable propane tanks supplied by delivery trucks ideally meet the needs of many people throughout the world. Terrifying accounts of home explosions due to propane gas, however, have had a significant affect on the industry. Individuals sometimes select more costly and less convenient means of heating their homes or supplying energy to home appliances because of the risks associated with propane, as discussed further below.

There are numerous reasons why the need for improved safety systems to distribute propane or other combustible gases has not previously been satisfied. Partially because individuals do not always follow safety instructions or think about the consequences of their actions, many have felt that these risks could never be significantly reduced. Various actions and circumstances, only some of which are described below, can cause the inadvertent release of propane gas into a home. In one instance, the homeowner's backyard gas storage tank has run low on fuel, so that the pilot lights for the furnace and gas consuming appliances are extinguished. If the propane tank is then refilled while the owner is at work or otherwise absent from the home, the newly supplied gas is released un-burned into the house. The homeowner may subsequently return to his house and turn on a light, which causes a spark and explosion.

In another situation, a duplex tenant may vacate his side of the building with his propane tank empty, so that his appliance shutoff valve for supplying propane to the clothes dryer is left open, although no gas is escaping. The landlord or new tenant decides to refill the propane tank, which results in an open gas line into the building. The gas escapes into the adjoining duplex, injuring parties having no involvement in the explosion.

In other cases, the gas regulator is positioned adjacent the propane tank, and a line extends a substantial distance from the tank to the house, business, or other dwelling. Water in the line freezes, thereby cutting off the supply to the gas appliances. Later that day the ice blockage in the line thaws due to warming outdoor temperatures, and gas thereafter flows to the appliances with extinguished pilots, resulting in the same safety hazard.

In still another instance, the gas regulator to a house fails to serve its intended purpose of reducing gas pressure to the residential furnace and appliances, possibly because its vent port has become plugged with ice, wasps nests, or other debris. If the gas regulator fails, the high pressure flow of gas to the appliance typically extinguishes the pilot, and the high pressure gas is released to quickly fill a home, and may cause either an explosion or asphyxiation of sleeping individuals. Alternatively, the gas appliance may have an operable shut-off valve responsive to a burning pilot in order to maintain the supply of gas to the appliance, and this valve desirably thus closes when the pilot blows out. The fittings in the line between the regulator and the appliance are not capable of sealing against this higher pressure, however, so that gas leaking from these fittings nevertheless releases hazardous gas into the dwelling.

Fisher has marketed various safety shut-off devices, Types 5256–5259. Rockwell has marketed regulators with a low pressure cut-off, and shut-off valves designed for overpressure protection, for underpressure protection, or for both underpressure and overpressure protection. These devices have not, however, alleviated the problems discussed above, and improved systems, equipment, and techniques are required to lessen the risk of combustible gas usage throughout the world.

The present invention thus fills a need which has long existed. While the techniques of this invention unfortunately will not prevent all accidents involving the distribution or use of propane and other combustible gases, it will significantly reduce many of those risks which are today causing tremendous losses to both life and property.

SUMMARY OF THE INVENTION

The gas lockout device of the present invention automatically terminates gas flow through a distribution line in response to an unsafe gas pressure, and prevents the re-opening of the activated or locked-out valve until the potentially dangerous situation can be reviewed and corrected. After the corrected situation is approved, the authorized personnel will only then be able to re-open the locked-out valve, utilizing a special key or code. The system of the present invention may be automatically activated to close the valve in response to either a set low or a set high gas pressure level, although preferably the system is reliably activated by either an unsafe low or an unsafe high pressure condition.

In an exemplary application, the gas distribution system comprises an outdoor storage tank, a regulator in the central flow line to the house, a lockout device within the house and thus downstream from the regulator but upstream from dividing gas lines extending to the furnace, water heater, gas dryer, stove and/or space heater. The installed gas shut off device is tamper-proof, so that bypassing the closed valve or "manipulating" the lockout device to cause its partial or total reopening without proper approval is, for practical purposes, eliminated.

A representative of the propane company uses a special key to re-open the activated or closed gas lockout device, but inherently must be within the house to perform this act, and thus will be practically forced to review the gas distribution system to check for open gas lines, and will re-light extinguished pilots after re-opening the shut-off device. If the shut-off device itself should fail due to a diaphragm leak, the propane representative may easily detect this situation, and replace the shut-off device.

During normal use, the gas pressure from the regulator is maintained between a set low pressure and a set pressure high level, and the lockout device remains continually open. If gas pressure drops below the set low pressure level (indicative of a very low gas or gas-out condition), the lockout device automatically closes. If the regulator fails and pressure rises above the gas high pressure limit (pilot blow-out condition), the valve similarly closes. The lockout device itself comprises a housing forming an interior cavity having a gas line inlet port and a gas output port. The cavity within the housing contains a diaphragm which sealingly separates a flow chamber from an isolation chamber. If the diaphragm leaks, the diaphragm senses a low gas pressure condition, and thus closes. A check valve normally seals the isolation chamber from the housing exterior, and remains closed in response to any pressure significantly greater than ambient (a condition which would occur if the diaphragm leaks).

The housing comprises two members bolted together and sealed with a static seal. The only seals required to seal the assembly of this invention preferably are static seals which are highly reliable, except for a single seal which is static at all times except for the infrequent re-setting operation. A control rod moves axially within the flow chamber in response to diaphragm movement resulting from normal gas pressure fluctuations. The control rod has a spring leaf affixed thereto, which acts as a stop to prevent a pivotable connecting rod from tripping or activating the lockout device. A closure member or valve is biased for sealing the output port from the flow chamber, but is normally prevented from closing by the connecting rod. If the control rod moves axially beyond the set low pressure or set high pressure limit, the spring leaf moves out of engagement with the connecting rod, thereby causing the automatic closure of the valve.

To re-open or re-set the closed valve, the designated propane company representative utilizes a special key to rotate the inner workings of a lock cylinder and a resetting rod attached thereto, which in turn causes the end of the connecting rod to move from the deactivated side to the activated side of the spring leaf. Assuming conventional pressure has been restored to the propane distribution system, the spring leaf again holds the valve open. The lockout device components are assembled so that the device cannot practically be serviced but also cannot be tampered with, and the lock cylinder cannot be practically removed without inherently destroying the device.

It is an object of the present invention to provide an improved system for safely distributing propane or other combustible gas from a storage tank to distribution lines extending to the furnaces, heaters, or appliances operated by the propane distribution system.

Another object of this invention is to improve the safety of a gas distribution system by utilizing a key, code, or other limited-access control mechanism for ensuring resetting of a lockout device by only authorized personnel.

It is a feature of the invention that the lockout device is automatically activated to close the gas flow line in response to gas pressure either falling below a set low pressure level or rising above a set high pressure level.

Another feature of the invention is that a leak in the sealing member separating the flow chamber from the isolation chamber can be easily detected, and this leakage past the sealing member will automatically close the shut off valve without allowing continual leakage of gas from of the isolation chamber.

It is an advantage of this invention that the safety lockout device is relatively simple in operation, and accordingly is both highly reliable and relatively inexpensive.

Another advantage of this invention is that the same assembly may be manufactured for use with various key locking mechanisms, so that the lockout keys or other control mechanisms which must be used to reset the lockout device need not be controlled by the manufacturer of the otherwise complete lockout assembly. Each gas supply company or each user may thus determine who has access to the key required to reset a locked-out device.

These and other objects, features, and advantages of the present invention will become apparent from the following detailed description, wherein reference is made to the figures in the accompanying drawings.

BRIEF DESCRIPTION OF THE DRAWINGS

FIG. 3 is a cross-sectional view taken along line 3—3 of FIG. 2.

FIG. 5 is a cross-section view of a portion of the device, taken along lines 5—5 of FIG. 2.

FIG. 6A is a cross-section view of a portion of the device in the locked position, taken along lines 6—6 of FIG. 2.

FIG. 6B is a cross-section view of a portion of the device in the tripped position, taken along lines 6—6 of FIG. 2.

DETAILED DESCRIPTION OF PREFERRED EMBODIMENTS

Figure 1:
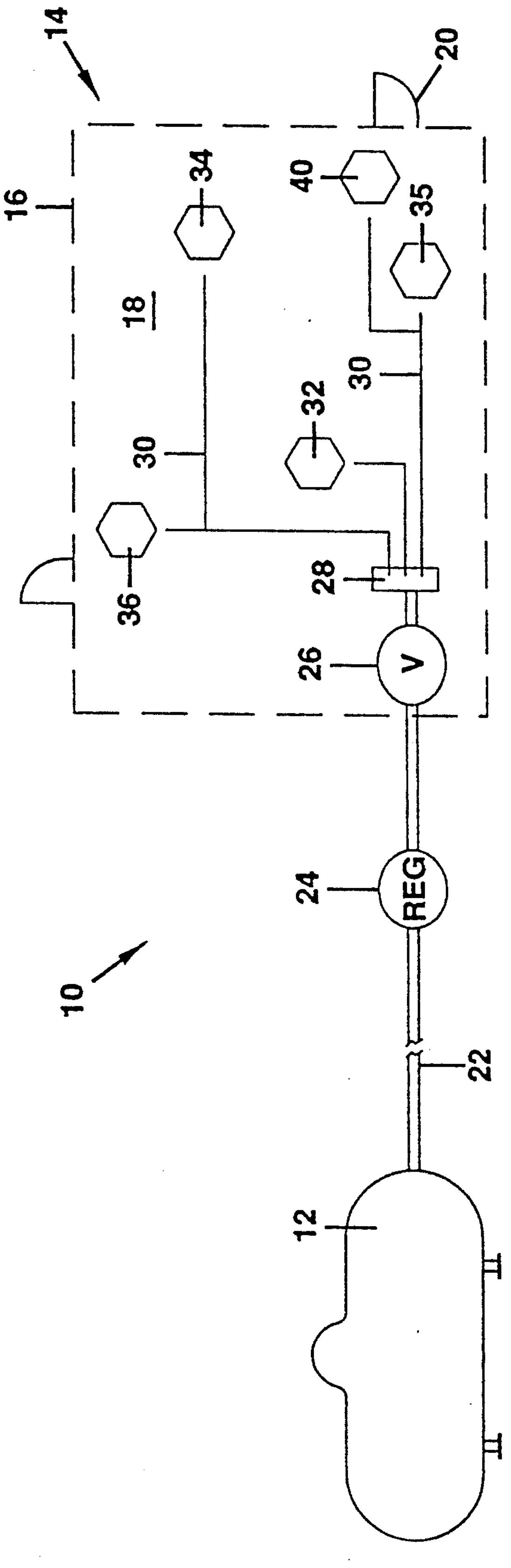
FIG. 1 is a simplified pictorial view of a gas distribution system for a residential application, with the system including a gas lockout device according to the present invention.

FIG. 1 is a simplistic representation of the gas distribution system 10 for supplying propane from storage tank or bottle 12 to dwelling 14, such as a house, having conventional exterior walls 16 which generally define a living area 18. A plurality of doors 20, or windows, screens, etc. (not shown) result in the air within the space or living area 18 being generally separated from the exterior of the dwelling.

A buried gas supply line 22 connects the tank 12 to a gas regulator 24, which in turn is generally positioned immediately outside of the dwelling exterior wall 16. The regulator 24 is supplied with high pressure gas from tank 12 at a typical pressure of 250 psi or less, with gas pressure decreasing as the tank is emptied. Gas flows into the dwelling and through the safety device 26 discussed below, then to manifold 28 which distributes gas through lines 30 to supply propane to conventional fuel-consuming devices, such as central furnace 32, oven 34, gas dryer 36, water heater 35, and space heater 40. For purposes of this description, the central gas line 22 to the house extends from the tank 12 to the regulator 24, and the gas distribution lines 30 are all the lines downstream of the regulator 24 which are intended to supply regulated low pressure gas to the furnaces and appliances. The pressure in each of the distribution lines 30 within the dwelling will thus preferably always be substantially less than the pressure within the line 22 upstream from the regulator 24, and typically will be from about 7 inches of water to about 32 inches of water to safely keep the pilots lit for each of the gas burners within the devices 32–40.

Figure 2:
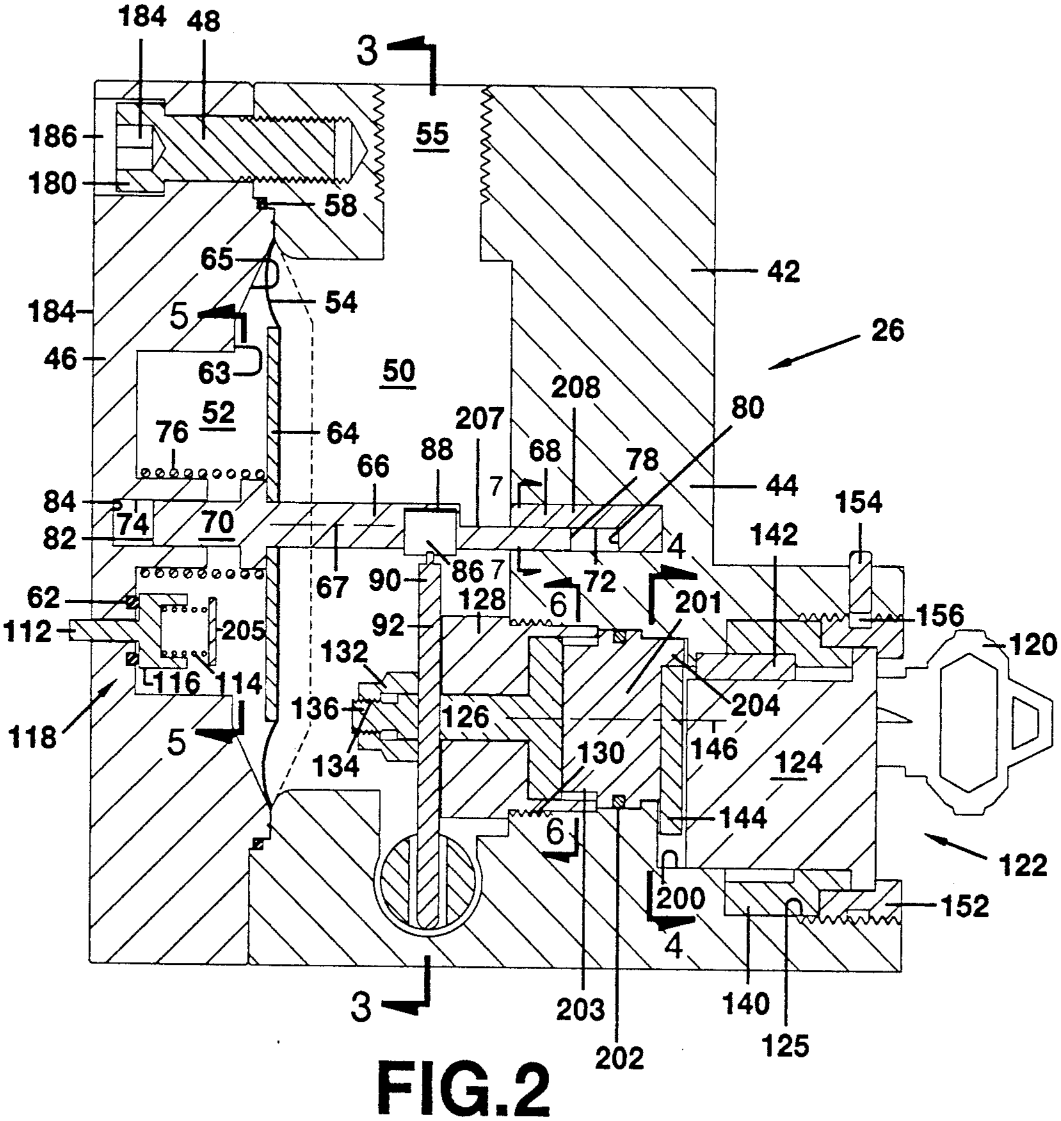
FIG. 2 is a cross-sectional view of a suitable gas lockout device according to the present invention.

Referring now to FIG. 2, the shut-off device 26 includes a metal housing 42, which comprises a bowl-shaped housing member 44 and a generally planar cover plate member 46 securely attached thereto by conventional bolts 48 or other securing members. The housing 42 defines an interior cavity including a flow chamber 50 and an isolation chamber 52, which are maintained in fluid separation by a diaphragm or other moveable sealing member 54. Threaded fluid input port 55 (FIG. 2) and a similar discharge port 56 (FIG. 3) are provided for fluid-tight connection with the flows lines 22 and 30, respectively. The edges of the diaphragm 54 are sealed to both the housing members 44 and 46. Preferably, a backup seal 58 is also provided for ensuring that fluid cannot flow either between or from either chambers 50 or 52. Other than the input and discharge ports 55 and 56, and the two ports sealed by O-rings 60 and 202 discussed subsequently, chamber 50 is thus isolated from the exterior of the device 26. The only discharge port from the isolation chamber 52 is normally sealed by a conventional O-ring seal 62 also discussed subsequently.

Elastomeric diaphragm 54 supports a metal reinforcing washer 64, which is welded or otherwise permanently secured in a fluid-tight manner to control rod 66, which is restrained for movement along axis 67 due to the mating configurations of control rod end 68 and 70 with pocket walls 72 and 74, respectively, provided within the housing members 44 and 46. When gas is not supplied to the device 26, a spring or other biasing member 76 preferably positioned within isolation chamber 52 moves the diaphragm 54 and thus the control rod 66 to a no-gas or unsafe low-pressure closed position, wherein end surface 78 of rod 66 is adjacent pocket base 80. When excessive gas pressure is supplied to the device 26, the diaphragm moves to compress the spring 76, so that the opposing end surface 82 of the rod 66 is adjacent the opposing pocket base 84, at which time the control rod is in a high-pressure closed position. It should be understood that movement of the diaphragm 54 only slightly increases or decreases gas pressure within the isolation chamber 52, which is normally filled with air and is fluid isolated from both chamber 50 and from the exterior of the pressure device 26.

Figure 7:
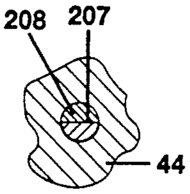
FIG. 7 is a cross-section view of a portion of the device, taken along line 7—7 of FIG. 2.

Spring steel leaf or a similar sheet-like plate 86 is bonded at its edge 88 to the control rod 66, and accordingly moves axially in response to changing input gas pressure. Rotation of rod 66 with respect to body 44 is prevented by planar surface 207 (see FIG. 7) on the semi-cylindrical end of rod 66 engaging a corresponding surface on key 208, which is effectively secured to housing 44. Accordingly, axial movement of rod 66 is permitted by key 208, although rotation of rod 66 relative to housing 44 is not permitted. If gas pressure remains between a selected low pressure gas value, e.g., 7 inches of water, and a selected high pressure gas value, e.g., 33 inches of water, the axial movement of the leaf 86 occurs while the leaf 86 slidingly moves along and continually supports the central end 90 of connecting rod 92. Connecting rod 92 is pivotable about axis 146 (see FIGS. 2 and 3), and the opposing end 96 of the connecting rod 92 is fitted within oversized bore 98 of valve member 100.

Referring now to FIGS. 2 and 3, the biasing spring 102 would normally move the valve member 100 toward the gas exit port 56 and thus to its closed position, with the O-ring 104 sealingly engaging seat 106, regardless of the gas pressure in the chamber 50. Normally, this movement is prevented and valve 100 is held in its open position by connecting rod 92, with end 96 within oversized bore 98 acting as a stop. Pivotable movement of the connecting rod 92, in turn, is prevented by the leaf 86, which also acts as a stop to prevent rotational movement of the connecting rod 92 in response to the force of spring 102.

If gas pressure to unit 26 drops below 7 inches of water, the end surface 78 approaches the pocket base 80, and the end 90 of the connecting rod 92 will fall off the leaf 86 (off the left side of the leaf as shown in FIG. 2). Similarly, if the gas pressure in chamber 50 rises above 33 inches of water, the spring 76 will be compressed and the end 90 of the connecting rod 92 will fall off the right side of the leaf 86. In either case, the connecting rod 92 will he "tripped" by the spring 102, which will close the valve member 100. It should be understood that the 7 inches of water and the 33 inches of water pressure levels discussed above are merely illustrative, and these pressure levels may be easily altered by changing the biasing force of the spring 76, and/or by changing the axial length of the leaf spring 86 or the position of the leaf 86 on the rod 66. Also, the width of the leaf 86 in a direction along axis 67 may remain fixed, and the width of the tip end of the connecting rod 92 may be varied to adjust the set low and the set high tripping pressures which will cause the actuation of the lockout device.

Referring again to FIG. 2, the connecting rod 92 thus trips in response to a low gas pressure condition, due to the force of spring 76 moving the control rod 66 to the right. The subsequent increase in gas pressure will not re-activate or re-open the device 26, however, since the end 90 of the connecting rod 92 or tripping member is still on the deactivated side 108 (see FIG. 3) of the leaf 86. Only when the end 90 is on the actuated side 110 of the leaf 86 or stop member can the leaf support the connecting rod 92 and prevent its tripping. Similarly, if the gas pressure rises above the gas high pressure limit, the propane gas representative must still reset the device, as described subsequently, since the reduction in gas pressure alone will not re-set the device 26.

The depth of the bores 72 and 74 in the bodies 44 and 46 must be sufficient to always allow the axial movement of the central rod 66 to permit the tripping action to occur. To minimize stress on the diaphragm 54, either or both of the surfaces 80, 84 may be positioned to act as a stop when engaged by end surfaces 78, 82, respectively. Once surface 78 engages surface 80, for example, further diaphragm movement to the right in FIG. 2 is prohibited, so that over-stretching of the diaphragm may be prevented. Also, the body 46 is provided with planar surface 63 and frustoconical surface 65 as shown in FIG. 2. Surface 63 acts as a stop to limit movement of the diaphragm support 64 by the left, thereby also preventing over-stretching of the diaphragm. Surface 65 acts as a stop surface or supporting surface for the elastomeric diaphragm material, and thus further contributes to longevity for the diaphragm in a high pressure situation.

If the diaphragm 54 should leak, the device 26 would improperly sense a low gas pressure condition and valve 100 would be tripped closed since cavity 52 does not vent to atmosphere. During the subsequent re-setting operation by the propane gas representative or specialist, the specialist would briefly compress the stem or valve release member 112 extending from the plate housing 46, thereby compressing the spring 114 and unseating the body 116 of the check valve 118 from the seal 62. Spring 114 thus acts against base 205, which is shown in FIGS. 2 and 5, to bias the check valve 118 closed. The specialist would then detect a slight release of propane from the device 26 (either with his olfactory senses or with a gas detector) and thus determine that the lockout device needed to be replaced because of a leaking or ruptured diaphragm. If air rather than propane was released from the isolation chamber 52 when the stem 112 was depressed, the specialist would reasonably conclude that the diaphragm 54 has not leaked. Even if the diaphragm 54 leaks, however, no substantial loss of propane from the device 26 will occur, and an unsafe condition accordingly would not result from leakage of diaphragm 54. The combination of chamber 52 and check valve 118 thus serve as not only a backup to the primary sealing member 54, but also a mechanism for easily detecting failure of the primary sealing member 54 without disassembly of the lockout device 26.

To re-open an activated or closed lockout device 26, the specialist would first ensure that no open gas lines are in the distribution system, and check whether propane was detected when the stem 112 was depressed. If the gas pressure has, for some reason, not been restored to be within the safe range of from 7 to 33 inches of water, the resetting operation will not be able to be successfully completed since the end 90 of the connecting rod 92 will not engage the spring leaf 86. The safety device 26 will thus remain closed, and the source of the problem resulting in the unsafe gas pressure range would first have to be identified and corrected.

Assuming gas pressure has, however, been restored to be within its safe range, the insertion of special key 120 in the lock assembly 122 allows the movement of internal components (not shown) within the lock cylinder 124, which in turn rotates resetting pin 126. Pin 126 is fixedly secured to and pivotably supports connecting rod 92, as shown in FIG. 2. Rotation of pin 126 by key 120 thus effectively rotates connecting rod 90 about axis 146 to move end 90 from the deactivated side 108 of leaf 86 to the activated side I 10 of 86. As the connecting rod moves past the leaf 86, the engaging end 90 lifts the leaf 86 from the control rod 80 and effectively bends the leaf about its edge 88. Referring to FIG. 3, the end 90 thus moves to the left during the resetting operation, and leaf 86 effectively flips in the clockwise direction about its weld line, then returns to the position depicted, so that the end 90 of the connecting rod 92 is now supported on the left side 1 1 0 of leaf 86. It should be understood that the leaf 86 actually may not rotate about its weld line 88, and in fact the portion of leaf 86 near weld line 88 may remain in engagement with the control rod 66. The body of the leaf 86 may thus deflect to the left along a gradual curve so that the end of the connecting rod passes by the front edge of the leaf. In any event, the leaf quickly returns to its position as shown in FIG. 3 to again support the connecting rod 92, and thus holds the valve member 100 in its open position.

Assembly 26 includes a resetting pin mount 128, which is connected to body 44 by threads 130. A cylindrical bore within mount 128 rotatably supports resetting pin 126 therein. An exemplary means for securing the connecting rod 92 to the pin 126 is a special nut 132 threaded at 134 to the end 136 of the pin 126. Various other mechanisms may be utilized for making the desired connection between pin 126 and rod 92.

The mount 128 is sized so that its threaded end positions plug 201 in place within the housing 44, with annular seal 202 forming a reliable seal between body 44 and plug 201. As explained subsequently, seal 202 is a static seal during 99+ percent of its life, and may be reliably formed by various techniques while known to the industry, e.g., an O-ring. Seal 202 is a dynamic seal only during the brief resetting operation to re-open the line 30 to resume normal gas pressure to the appliances.

Referring now to FIG. 3, the biased valve member 100 may be positioned within the open port 101 within the body 42, then the closure bolt 158 with threads 160 may be screwed in place until the static seal 162 seals between the members 158 and 44. The seal 162 is a purely a static seal, and reliable sealing engagement may be accomplished with various conventional seals. The bolt 158 is provided with screwdriver slot 164 and, if desired, this slot 154 may be specially formed with a unique head design so that a special tool is required to remove the bolt 158 and then the valve member 100. Preferably, however, the bolt 158 may be permanently fixed to the housing 44 by pin 165 which is hammered into a drilled hole extending through both a portion of body 44 and into the bolt 158, as shown in FIG. 3.

The sealing end of the valve member 100 may be provided with components to increase sealing reliability and long life, while decreasing the effort required to reset the tripped lockout device. Prior to the rod 92 tripping, pressure within the chamber 50 is not biasing the valve member 100, so that the spring 102 closes the valve member 100 under any pressure once the connecting rod 92 is tripped. When the closed valve is re-opened, the rotation of the key 120, acting through the pin 126 and connecting rod 92, moves the valve member 100 away from the port 56, which action first unseats the elastomeric sealing member 166 mounted at the end 168 of the valve member 100 by lifting the seal off the seating surface 170 of sealing sleeve 172. It may be seen that the valve member 100 may thus move axially relative to the sealing sleeve 172, since the diameter of cross-pin 174 extending between the walls of the sleeve 172 is less than the bore 176 within the end 168 of valve member 100. Once the seal 166 has been raised from the seat 170, the pressure across the seal 104 is at least partially equalized, and the slightly positive pressure within flow chamber 50 compared to ambient pressure in the distribution lines 30 and thus in port 56 does not hamper re-opening of the lockout device. Due to the design of the valve closure assembly 103, low torque on the key 120 is required to overcome remaining differential pressure across the seal 104 and compress the spring 120, and thereby place the valve member 100 and the sleeve 172 approximately at the position as shown in FIG. 3. As previously indicated, this technique also enhances the life of the sealing member 104, thereby increasing reliability of the lockout valve.

The lock assembly 122 as shown in FIG. 2 includes a positioning ring 140 for positioning the sub-assembly 124 with respect to the body 44, and a key or stop 142 for preventing rotational movement between the outer sleeve of sub-assembly 124 and the body 44. Turning of the key 120 thus rotates the interior components (not shown) within the sub-assembly 124 in a conventional lock assembly manner, which then rotates the lock end member 144 about an arc having its center aligned with the axis 146 of pin 126. A mechanical connection between the lock end member 144 and plug 201 is accomplished with ears 204 on plug 201 to cause rotation of 201 during rotation of the key 120 during the resetting operation. During this resetting operation, an offset stud 148 extending from the head 150 of pin 126 rotates from the tripped position as shown in FIG. 6B to the reset position as shown in FIG. 6A. It should be pointed out that the lock assembly 122 shown in FIG. 2 is well known in the art, and accordingly various lock arrangements may be used with little or no modification to the completed assembly 26 as described herein exclusive of the lock assembly 122. During this brief resetting operation, the seal 202 is thus a dynamic seal.

The port 200 in the body 44 as shown in FIG. 2 is the final port which must be sealed. In normal operation, i.e., valve open position of the lockout device, this port is sealed by the static seal 202. Tripping of rod 92 may thus occur without rotation of plug 201, so that seal 202 remains a static seal during the normal open position of the lockout device 26, and also during its brief tripping operation to close the valve. Plug 201 rotates during the resetting operation, so that only during this brief period, when the propane company representative is inherently at the site of the lockout device within the home or other enclosure, is the seal 201 a dynamic seal.

Figure 4:
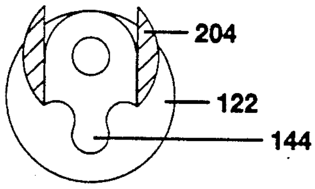
FIG. 4 is a cross-sectional view of a portion of the gas lockout device shown in FIGS. 2 and 3, with the cross-sectional view taken along lines 4—4 of FIG. 2.

FIG. 4 illustrates the mechanism connecting the operative end of the lock assembly 122 to the plug 201, and FIG. 6 illustrates a connection between the plug 201 and the pin 126. In FIG. 6A, the offset stud 148 protruding from the head of the pin 126 is shown in its normal (key removed) position, and accordingly the pin 126 is in its normal (untripped-gas free to flow) position. When a trip occurs, rotation of the pin 126 causes the stud 148 to move to the position as shown in FIG. 6B with respect to the end face 203 of plug 201, which is facing the pin 126, and valve member 100 shuts against seal face 106 driven to that position by biasing spring 102. During this tripping operation, the seal 202 on the plug 201 thus remains a static seal. To reset the device, key 120 is inserted into lock assembly 122 and rotated counter-clockwise, causing lock end member 144 to rotate plug 201 counter-clockwise, thereby forcing stud 148 to again be positioned as shown in FIG. 6A. If normal gas pressure has been established, end 90 of connecting rod 92 will catch on the side 110 of leaf or plate 86, as shown in FIG. 3. The plug 201 may then be rotated by lock end member 144 clockwise to its centered position, as shown in FIG. 6A and the key 120 may be removed.

The lock assembly 122 may be permanently secured within the housing member 44, by simultaneously inserting the assembly 122 and inserting ring 140 as shown in FIG. 2 within the standard lock port 200 and port 125 respectively, in the body 44. The locking collar 152 may be threaded to the body 44 until ring 140 is sandwiched between the collar 152 and the body 44. Pin 154 may then be hammered down so that its end fits within a circular groove 156 provided in the collar 152, thereby permanently securing the body 44 to the locking ring 152, and thus effectively preventing removal or tampering of lock assembly 122. The locking assembly 122 is not subjected to gas passing through the lockout device due to seal 202 discussed above.

It should be understood that the key 120 is not a conventional key, which may be easily duplicated by various locksmiths. Instead, the key 120 is of the type manufactured and sold by Schlage Company under Model No. 20-787-CP, and is referred to here in as a non-duplicable key. Keys 120 may thus be controlled by the propane distribution company, and may be given only to selected employees who are authorized to reset assembly 26 after performing the safety check on a residence. Also, it should be understood that various modifications may be made to the concept of a key or control device which may be part of the lockout device according to this invention. Instead of using a non-duplicating key, a card key or code technique could be used, wherein the card key or code access was limited to authorized personal. Accordingly, it should be understood that, if desired, the assembly of the present invention could become more sophisticated with respect to limiting access to persons who can reset the unit. As one example, the assembly of the present invention could be activated by a daily changeable code given only to limited individuals, who then must input both the daily code and their employee identification code into the device, which includes a computer to qualify that individual to reset the lockout device, then stores that reset information by date and employee identification in its memory before allowing the resetting operation to begin.

It should be understood that the assembly as described herein, with the exception of the lock assembly 122 but inclusive of the resetting pin 126, may be shipped by a manufacture to a propane company, which then installs the lock assembly 122 into the otherwise completed device. The propane manufacturer may thus purchase the lock assemblies 122 from a source other than the lockout device manufacturer, and permit only authorized personnel to install the lock assembly 122 into the otherwise completed assembly 26 by hammering the pin 154 to ensure that the lock assembly is now a permanent part of the housing 42, and cannot practically be removed without destroying the assembly. Each gas company may thus use a different lock assembly or a different key type, so that an authorized resetting operator for one gas company would only have the ability to reset a lockout device for a customer of his employer or, if desired, only to portions of customers of his employer which are "keyed" to receive the key which in the custody of that employee.

It should also be noted that reference throughout this application to a propane company representative or "specialist" is a convenient means of describing a significant feature of this invention, although again the control is desirably within the lockout device user or propane company to determine who has access to the key or code, and is thus able to perform the resetting operation. At the present time, it is envisioned that in most instances the resetting specialist will be the representative of the propane company who specializes in reviewing gas distribution systems for a residence, and will only reset the locked-out device once the proper checks have been performed, and will thereafter re-light all the pilots and ensure that the system is properly functioning before his departure. The lockout device of this invention may also be used in a natural gas distribution system to one or more dwellings, such as rental houses or apartments which have a high frequency of gas shut-off and subsequent gas line reopening operations. All of the benefits and safety advantages of the present invention may be achieved as long as the manual resetting operation is performed only after the requisite safety checks have been made, and the pilots relit after gas has been restored to the appliances.

The high reliability for the technique according to the present invention to achieve its desired objective, namely to shut off gas flow when pressure drops below or rises above a preselected safety range, and to allow reopening of a locked out unit only after a safety check has been performed, is best achieved by positioning the assembly 26 within the house or other structure or enclosure. This positioning ensures that the resetting specialist must physically be within the house to perform the resetting operation. The function and purpose of the device is not achieved if the assembly 26 is mounted exterior of the house, unless the specialist nevertheless enters the house to check the distribution system before commencing the resetting operation, and re-lights the pilots after re-opening the lockout device. The desired safety factor is thus obtained by placing the shut-off device 26 within the home or other enclosure.

Few modifications to the assembly described herein would be required in order to make the lockout device of the present invention responsive to either high pressure or low pressure, rather than both high and low pressure. According to one technique, the length of the leaf 86 could simply be extended, so that the connecting rod 92 would never fall off the leaf 86 in response to the low pressure or high pressure condition, respectively. It should also be understood that the low pressure limit and high pressure limit of the valve may be made adjustable by providing an adjustment screw or similar thread mechanism for altering the position of the leaf 86 relative to the control rod 66. As previously noted, however, it is a particular feature of the present invention that the valve member 100 be responsive and automatically close in response to either a low pressure condition or a high pressure condition.

As shown in FIG. 2, the head of 180 of each of the bolts 48 may be provided with an Allan head pocket 184, or with a specialized pocket requiring a particular tool to remove the bolt 48 and disconnect the bodies 44 and 46. It may also be seen that the cavity within the body 46 for receiving the head 180 may be deeper than the head, and the cavity between 180 and the outer surface 184 of the body 46 may then be filled with a liquid metal 186, which further ensures that disassembly of the lockout device 26 will only reasonably be accomplished, if at all, by authorized personnel. The unit of the present invention is thus substantially sealed, and is not intended to be serviceable. In particular situations, the manufacturer of the unit may reuse certain components to assemble a new unit. The likelihood of failure of the unit is low, although it is envisioned that over an extended period of time the diaphragm 54 might leak. To make the lockout device of the present invention reliable over a longer period of time, a different fluid separation device, such as a sliding piston, might be used to separate the flow chamber 50 from the isolation chamber 52, although the unit described above is preferable due to its low cost.

Those skilled in the art will also understand that various mechanisms might be used to sense the movement of the diaphragm or other valve member, and automatically trip a valve or other closure member in response to movement of the sealing member beyond predetermined limits. Those skilled will also understand that various mechanisms might also be used for resetting a lockout device which has automatically closed, although the resetting mechanism preferably is neither costly nor complex, and should be highly reliable.

Additional modifications and alterations to the embodiments and methods described above should now be apparent to one skilled in the art from the foregoing description. Various further modifications may thus be made in accordance with the teachings of the present invention, and the invention is thus not restricted to the preferred embodiments discussed herein and shown in the accompanying drawings. The scope of the invention should thus be understood to include all embodiments within the reasonable scope of the following claims.

What is claimed is:

1. A method of supplying a combustible gas to one or more burners of gas consuming equipment each positioned within an enclosure, the gas being supplied from a storage vessel positioned exterior of the enclosure and passing through a distribution line extending to the one or more gas consuming equipment, the method comprising:

regulating high pressure gas from the storage vessel to output low pressure gas to the gas distribution line;

sensing gas pressure within the distribution line;

automatically closing the gas distribution line within the enclosure in response to one of a sensed low gas pressure level and a sensed high gas pressure level;

automatically preventing reopening of a closed gas distribution line in response to the subsequent upstream gas pressure changes within the distribution line;

normally preventing closing of the gas distribution line when gas pressure through the distribution line is above the low gas pressure level and below the high gas pressure level; and providing a security control member for restricting to selected personnel the reopening of the gas distribution line.

2. The method as defined in claim 1, wherein the step of automatically closing the gas line includes:

biasing a closure member into sealing engagement with a seat for closing the gas line.

3. The method as defined in claim 2, wherein the step of normally preventing closing of the gas distribution line further includes:

positioning a stop for prohibiting actuation of the closure member; and automatically removing the stop in response to sensed gas pressure exceeding a set limit, such that removing the stop causes the biased closure member to seal the flow through the gas distribution line.

4. The method as defined in claim 2, further comprising:

providing the first housing having a gas inlet, a gas outlet, and a gas flow chamber therein interconnecting the gas inlet and the gas outlet;

providing a second housing having an isolation chamber therein;

fluidly separating the gas flow chamber from the isolation chamber; and manually activating a check valve to allow the escape of gas from the isolation chamber.

5. A combustible gas distribution system for supplying a combustible gas to one or more burners of gas consuming equipment each positioned within an enclosure, the gas being supplied from a storage vessel positioned exterior of the enclosure, the system comprising:

a gas regulator positioned exterior of the enclosure for receiving high pressure gas from the storage vessel and outputting low pressure gas to the gas consuming equipment;

a gas distribution line extending from the gas regulator to the one or more gas consuming equipment; and a gas lockout device positioned within the enclosure and downstream from the gas regulator and upstream from the one or more gas consuming equipment, the lockout device including a low gas pressure sensor responsive to gas pressure within the distribution line below a low gas pressure level, a high gas pressure sensor responsive to gas pressure within the distribution line above a high gas pressure level, a closure member for automatically closing the gas distribution line in response to either one of the low gas pressure sensor and the high gas pressure sensor, a stop member for normally preventing actuation of the closure member when gas pressure through the distribution line is above the low gas pressure level and below the high gas pressure level, and a reset member for repositioning the stop member to re-open a closed gas lockout device, the stop member, the reset member, and the closure member cooperating to automatically prevent re-opening of the gas distribution line closed by the closure member unless the stop member is repositioned by the reset member.

6. The gas distribution system as defined in claim 5, further comprising:

a security control member for restricting repositioning of the stop member and thereby reopening the lockout device to selected personnel.

7. The gas distribution system as defined in claim 5, wherein the gas lockout device further comprises:

a movable sealing member responsive to gas pressure within the lockout device; and a tripping member responsive to movement of the sealing member for releasing the stop member to automatically close the closure member.

8. The gas distribution system as defined in claim 7, further comprising:

a plug member acting between the security control member and the tripping member, the plug member being movable within a lockout device housing for dynamic sealing engagement with the housing during a lockout device resetting operation, and the plug member permitting actuation of the tripping member without movement within the plug member such that the plug member is in static sealing engagement with the housing prior to and during the tripping operation.

9. The combustible gas distribution system as defined in claim 8, further comprising:

the sealing member movably separating a flow chamber from an isolation chamber;

the check valve for normally sealing the isolation chamber from the exterior of the lockout device; and a valve release member manually controllable to move the check valve to an open position and allow the escape of gas from the isolation chamber.

10. The combustible gas distribution system as defined in claim 9, further comprising:

a control rod axially movable in response to movement of the sealing member:

the stop member is a control pad secured to the control rod; and the tripping member is a connecting rod extending between the control pad and the closure member, the tripping rod normally being supported by the control pad for acting as a stop to prohibit actuation of the closure member, while also releasing from the control pad for automatically closing the closure member as a function of axial movement of the control rod in response to gas pressure.

11. The combustible gas distribution system as defined in claim 8, wherein the gas lockout device further comprises:

a sealing member being movable along a sealing member axis in response to gas pressure within the lockout device; and a biasing member for biasing the sealing member to a position causing actuation of the tripping member and closure of the closure member.

12. The gas distribution system as defined in claim 5, wherein the gas lockout device further comprises:

a biasing member for biasing the closure member to a closed and lockout position.

13. The combustible gas distribution system as defined in claim 5, wherein the gas lockout device further comprises:

a first housing having an inlet, an outlet, and a gas flow chamber therein interconnecting the inlet and the outlet;

a second housing having an isolation chamber therein; and a sealing member sealingly separating the gas flow chamber from the isolation chamber.

14. The combustible gas distribution system as defined in claim 13, further comprising:

a plurality of connecting members for interconnecting the first housing and the second housing; and a corresponding plurality of security members for preventing deactivation of the plurality of connecting members.

15. A lockout device for a combustible gas distribution system supplying a combustible gas via a distribution line to one or more burners of gas consuming equipment, the lockout device comprising:

a low gas pressure sensor responsive to an unsafe low gas pressure within the distribution line;

a high gas pressure sensor responsive to an unsafe high gas pressure within the distribution line;

a closure member for automatically closing the gas distribution line in response to either one of the low gas pressure sensor and a high gas pressure sensor;

a stop member for normally preventing actuation of the closure member when gas pressure through the distribution line is maintained within a safe level;

a movable sealing member responsive to gas pressure within the lockout device and separating a flow chamber from an isolation chamber;

a tripping member responsive to movement of the sealing member for releasing the stop member to automatically close the closure member;

a check valve for normally sealing the isolation chamber from the exterior of the lockout device; and a reset member for repositioning the stop member to re-open a closed gas lockout device.

16. The lockout device as defined in claim 15, further comprising:

a security control member for restricting repositioning of the stop member and thereby reopening the lockout device to selected personnel.

17. The lockout device as defined in claim 15, further comprising:

a plug member acting between the security control member and the tripping member, the plug member being movable within a lockout device housing for dynamic sealing engagement with the housing during a lockout device resetting operation, and the plug member permitting actuation of the tripping member without movement within the plug member such that the plug member is in static sealing engagement with the housing prior to and during the tripping operation.

18. The lockout device as defined in claim 15, further comprising:

a valve release member manually controllable to move the check valve to an open position and allow the escape of gas from the isolation chamber.

19. The lockout device as defined in claim 15, further comprising:

a first housing having an inlet, and outlet, and the gas flow chamber therein interconnecting the inlet and the outlet; and a second housing having the isolation chamber therein.

20. The lockout device as defined in claim 15, further comprising:

a biasing member for biasing the closure member to a closed and lockout position.

21. The lockout device as defined in claim 15, further comprising:

the sealing member being movable along a sealing member axis in response to gas pressure within the lockout device; and a biasing member for biasing the sealing member to a position causing actuation of the tripping member and thus closure of the closure member.

22. The lockout device as defined in claim 15, further comprising:

a sealing member biasing member for biasing the movable sealing member responsive to gas pressure within the lockout device;

a closure member biasing member for biasing the closure member to a closed position; and the tripping member isolating the biasing force of the sealing member biasing member from the biasing force of the closure member biasing member, such that the closure member biasing member does not affect the desired biasing force on the sealing member.

* * * * *